Aug. 27, 1935.     J. W. JAGERSBERGER     2,012,512
INTERNAL COMBUSTION ENGINE
Filed June 29, 1933     2 Sheets-Sheet 1

INVENTOR
Joseph W. Jagersberger
BY
Charles ? French
ATTORNEYS

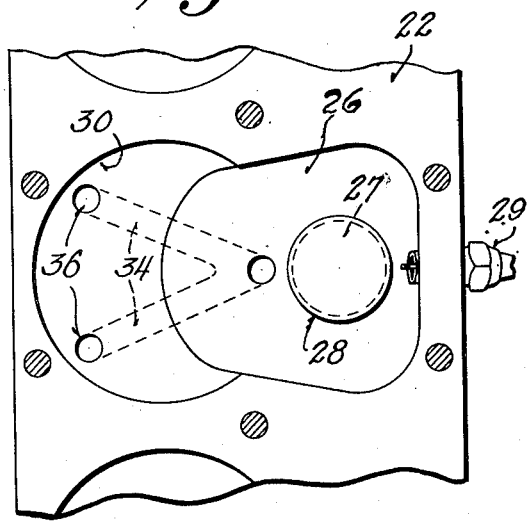
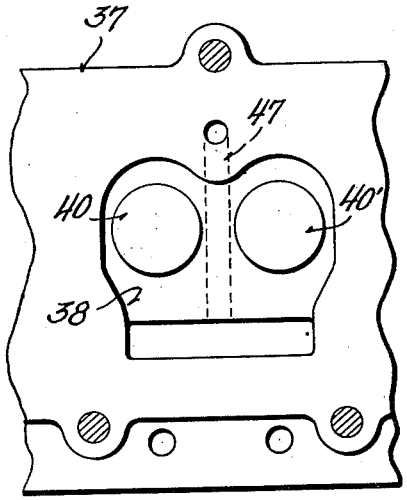
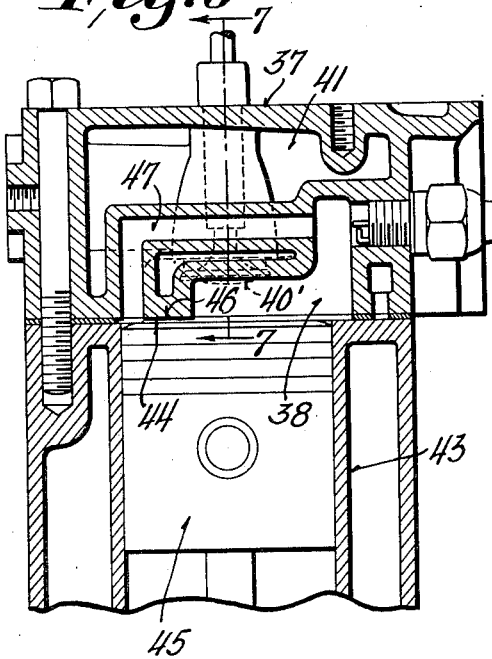
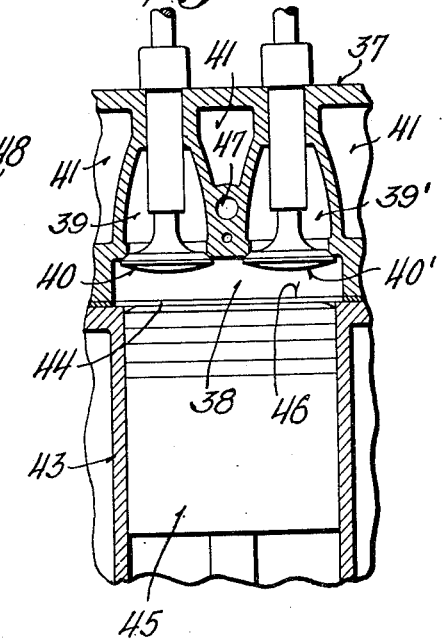

Patented Aug. 27, 1935

2,012,512

UNITED STATES PATENT OFFICE 2,012,512

INTERNAL COMBUSTION ENGINE

Joseph W. Jagersberger, Racine, Wis., assignor to Rajo Motor Company, Racine, Wis., a corporation of Wisconsin Application June 29, 1933, Serial No. 678,111

10 Claims. (Cl. 123—191)

The invention relates to internal combustion engines.

It is recognized that the form of the combustion chamber in a constant volume combustible mixture internal combustion engine has a marked effect on combustion and that detonative tendencies may be prevented and high compression pressures employed where the form or shape of said chamber is given careful consideration. It is the object of this invention to improve the combustion chamber design of engines of the above type which will permit of the use of high compression pressures and will promote efficient combustion without detonative tendencies. More particularly the invention is designed to provide an arrangement whereby that portion of the charge which is usually last to burn is prevented from detonating in combustion chambers of the usual or any suitable design and in addition the compression pressure may be materially increased over the usual practice.

The invention further consists in the several features hereinafter set forth and more particularly defined by claims at the conclusion hereof.

In the drawings:

Fig. 5 is a bottom plan view of a head shown in Fig. 4;

Fig. 6 is a view similar to Fig. 1 showing another modification;

Fig. 7 is a vertical sectional view of the head taken on the line 7—7 in Fig. 6.

Fig. 8 is a bottom plan view of the head shown in Fig. 6.

Figure 1:
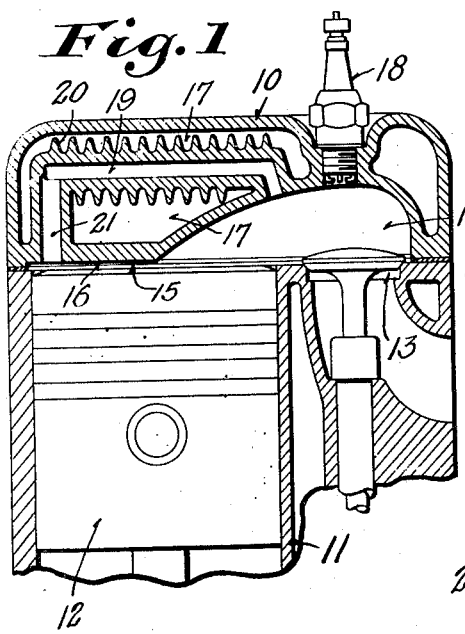
Fig. 1 is a vertical sectional view through an internal combustion engine embodying the invention.
Figure 2:
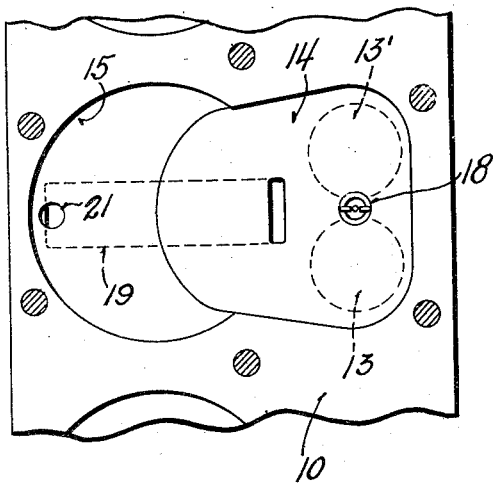
Fig. 2 is a bottom plan view of the head shown in Fig. 1.

Referring to Figs. 1 and 2, I have shown a four cycle L-head engine in which the head 10 is secured to the cylinder 11 in which the piston 12 reciprocates, said cylinder having valve-controlled inlet and outlet passages 13 and 13′ respectively, which are offset to one side of the cylinder.

The head 10 is formed to provide a main combustion chamber 14 in which the greater portion of the gaseous mixture forming the charge is compressed during the compression stroke and with which the passages 13 and 13′ communicate. This chamber overlies the cylinder bore so as to provide a means of direct communication therewith the area of which is less than that of the cylinder bore and usually large enough to prevent throttling of the gases passing through it. A clearance space 15 is provided between the top of the piston and the bottom 16 of the head overlying the cylinder bore. The height of this clearance space and the manner of forming it varies but it is usually of relatively small height so that the gases confined in it are cooled by the cooled bottom 16 of the head, the head having the jacket or water spaces 17 therein. Sometimes the height of this clearance is determined by the thickness of the cylinder head gasket, although it may also be determined by specially recessing the head or allowing the piston top to be spaced below the top of the cylinder when at the end of the outward or upward stroke. The spark plug 18 may be disposed in any suitable location in the chamber 14 and is usually arranged at the upper central portion of said chamber or over or adjacent to the exhaust valve.

Figure 3:
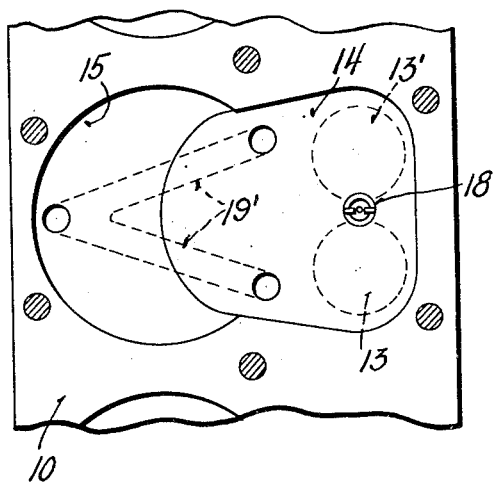
Fig. 3 is a view similar to Fig. 2 showing a certain modification.

According to the present invention, I provide a passage 19 connecting the clearance space 15 with the chamber 14, the walls of which are cooled by the jacket water and are preferably provided with fins 20 to enhance the cooling effect. This passage at one end 21 preferably connects with the space 15 at a point remote from the chamber 14 and from the spark plug 18 while at its other end it may enter the chamber adjacent the plug or central part of the chamber, as shown in Fig. 1, or adjacent the opposite end of the clearance space as shown in Fig. 3. This figure also shows the passage as having spaced branches 19′ entering the chamber 14. By experiment and by operation of engines equipped with the invention under conditions met with in practice it has been found that detonative tendencies may be prevented and a high compression pressure utilized. For example, with one head of the general character described, it has been possible to raise the compression ratio from 4.2 to 1 to 7 to 1. Just how this passage brings about these results is not known. It does of course have an appreciable cooling effect on the gas last to burn and it also may cause a shifting of the last portion of the charge to burn into a space better cooled than the clearance space 15. It will also have a pressure equalizing effect in case of any localized pressure action.

Figure 4:
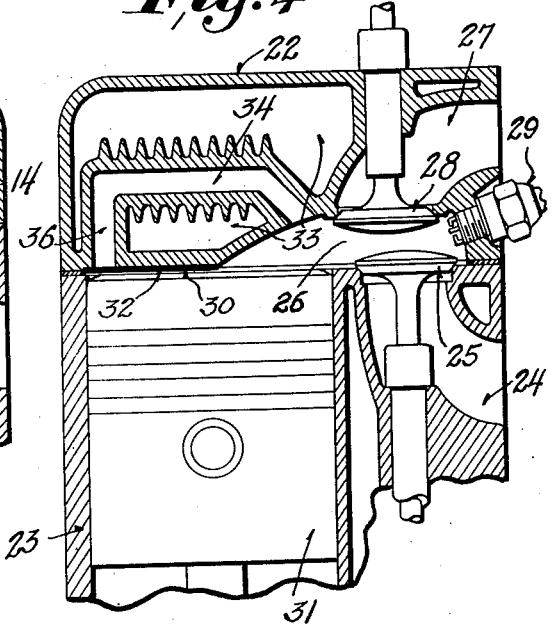
Fig. 4 is a view similar to Fig. 1 showing another modification.

In Figs. 4 and 5 I have shown an F-head engine in which the head 22 is secured to the cylinder 23 which has the outlet port 24 controlled by the exhaust valve 25.

The head 22 is formed to provide a main combustion chamber 26 in which the greater portion of the gaseous mixture forming the charge is compressed during the compression stroke and with which the port 24 communicates. This chamber overlies the cylinder bore so as to provide a means of direct communication therewith the area of which is less than that of the bore and usually large enough to prevent throttling of the gases passing therethrough. The head has an inlet passage 27 communicating with the chamber 26 and controlled by the valve 28. The spark plug 29 enters the chamber 26 between the valves. A clearance space 30 is provided between the top of the piston 31 and the cooled bottom 32 of the head which is formed as in the first described construction, the head having the jacket or water spaces 33 therein.

A passage 34 connects the clearance space 30 with the chamber 26, said passage having two branches entering said clearance space as shown in Fig. 5, the walls of which are cooled by the jacket water and are preferably provided with fins similar to the fins 20 to enhance the cooling effect. This passage at its ends 36 preferably connects with the space 30 at a point remote from the chamber 26 and from the spark plug 29 while at its other end it enters the chamber adjacent said plug. This passage cooperates with the other parts to secure the same results or effects as the first described construction.

In Figs. 6, 7 and 8 I have shown a valve-in-the-head engine in which the head 37 is formed to provide a main combustion chamber 38 with which the inlet and outlet passages 39 and 39' communicate and which passages are controlled by the intake and exhaust valves 40 and 40' respectively. The head has a jacket space 41. A part of the chamber 38 overlies the bore of the cylinder 43. A clearance space 44 is provided between the top of the piston 45 and the cooled bottom 46 of the head.

A passage 47 connects the clearance space 44 with the chamber 38 and is here shown as formed by intersecting bores drilled in the head. This passage enters said clearance space at a point remote from the spark plug 48 which is mounted in the combustion chamber 38. This passage 47 is cooled in a manner similar to the first described construction and in a similar manner acts to prevent detonation and permit an increase in compression pressures.

In connection with the passages above described, it is to be noted that flat sided passages, round passages and passages of other suitable shapes may be used. It is also to be noted that these passages provide restricted communication between the chambers or spaces with which they connect and that their volumes are relatively small compared to the total volume of the combustion chamber.

In addition to the improved combustion and the increased compression it has been found that engines equipped with the invention are very smooth in operation and the so-called shock or rough running is eliminated.

I desire it to be understood that this invention is not to be limited to any particular form or arrangement of parts except in so far as such limitations are included in the claims.

What I claim as my invention is:

1. In an internal combustion engine, the combination of a cylinder, a piston reciprocating in said cylinder, a head forming a combustion chamber communicating with said cylinder, means for supplying combustible gas to said chamber prior to compression, spark ignition means for said chamber, there being a clearance space between said piston and head when the piston is at the end of its compression stroke, said head having a cooled passage of a relatively small volume compared to the total volume of the charge connecting said clearance space, only at a point remote from said combustion chamber, with said chamber.

2. In an internal combustion engine, the combination of a cylinder, a piston reciprocating in said cylinder, a head having a combustion chamber communicating with said cylinder, combustible gas inlet and burned gas outlet passages for said combustion chamber, valves for said passages, spark ignition means for said combustion chamber, there being a clearance space of relatively small volume between said piston and head when the piston is at the end of its compression stroke, said head having a cooled passage of a relatively small volume compared to the total volume of the charge connecting said clearance space, at a point remote from said combustion chamber, with said chamber.

3. In an internal combustion engine, the combination of a cylinder, a piston reciprocating in said cylinder, a head having a combustion chamber communicating with said cylinder and offset therefrom and restrictedly communicating therewith, combustible gas inlet and burned gas outlet passages for said combustion chamber, valves for said passages, spark ignition means for said combustion chamber, there being a clearance space of relatively small volume between said piston and head when the piston is at the end of its compression stroke, said head having a cooled passage, of a relatively small volume compared to the total volume of the charge connecting said clearance space, at a point remote from said combustion chamber, with the central portion of said chamber.

4. In an internal combustion engine, the combination of a cylinder, a piston reciprocating in said cylinder, a head having a combustion chamber communicating with said cylinder, combustible gas inlet and burned gas outlet passages for said combustion chamber, there being a clearance space between said piston and head when the piston is at the end of its compression stroke, means for initiating ignition of the charge in said combustion chamber, said head having a cooled passage, of a relatively small volume compared to the total volume of the charge for cooling the last portion of the charge to burn and connecting said clearance space with the main part of said combustion chamber and also serving to cool gases passing therethrough during compression to reduce the initial compression temperature of the charge of combustible gas.

5. In an internal combustion engine, the combination of a cylinder, a piston reciprocating in said cylinder, a head forming a combustion chamber communicating with said cylinder, means for supplying combustible gas to said chamber prior to compression, there being a clearance space adjacent the piston representing a relatively small proportion of the volume of the gaseous charge at the end of the compression stroke and in which the portion of the charge last to burn is usually confined, said head having a cooled passage, of relatively small volume compared to the total volume of the charge, connecting said clearance space adjacent the piston with that portion of the combustion chamber usually containing the part of the charge first to burn.

6. In an internal combustion engine, the combination of a cylinder, a piston reciprocating in said cylinder, a head forming a combustion chamber communicating with said cylinder, means for supplying combustible gas to said chamber prior to compression, there being a clearance space adjacent the piston representing a relatively small proportion of the volume of the gaseous charge at the end of the compression stroke and in which the portion of the charge last to burn is usually confined, said head having a cooled passage, disposed exteriorly of said combustion chamber, of relatively small volume compared to the total volume of the charge, connecting said clearance space adjacent the piston with the main part of the main combustion chamber, and spark ignition means for said combustion chamber.

7. In an internal combustion engine, the combination of a cylinder, a piston reciprocating in said cylinder, a head having a combustion chamber communicating with said cylinder, combustible gas inlet and burned gas outlet passages for said combustion chamber, valves for said passages, spark ignition means for said combustion chamber, there being a clearance space of relatively small volume between said piston and head at one side of the cylinder bore when the piston is at the end of its compression stroke and in which the portion of the charge last to burn is usually confined, said head having a cooled passage, of relatively small volume compared to the total volume of the charge, connecting said clearance space at a point remote from said combustion chamber, with said combustion chamber adjacent said ignition means.

8. In an internal combustion engine, the combination of a cylinder, a piston operable in said cylinder, a head closing off the open end of the cylinder and providing a clearance space above the piston, means for supplying combustible gas to said space prior to compression, spark ignition means at one side of the cylinder, said head having a cooled passage of relatively small volume compared to the total volume of the charge, connecting that portion of said clearance space remote from said ignition means with the part of said space adjacent said ignition means.

9. In an internal combustion engine, the combination of a cylinder, a piston operable in said cylinder, a head having a clearance space providing a combustion chamber including a part of constant volume and a part of varying volume, means for supplying combustible gas to said chamber prior to compression, and a cooled passage connecting the part of varying volume with the part of said chamber of constant volume and being of greater length than the length through the clearance space to the ends of said passage.

10. In an internal combustion engine, the combination of a cylinder, a piston reciprocating in said cylinder, a head closing off the open end of the cylinder and providing a clearance space above the piston and a combustion chamber, inlet and outlet passages for said combustion chamber, valves in the head for said passages, ignition means for said combustion chamber, said head having a cooled passage of relatively small volume compared to the total volume of the charge, connecting that portion of the clearance space remote from said ignition means with the part of said combustion chamber adjacent said ignition means and extending through said head above the heads of said valves.

JOSEPH W. JAGERSBERGER.